(12) United States Patent
Boxwell et al.

(10) Patent No.: US 11,106,717 B2
(45) Date of Patent: Aug. 31, 2021

(54) AUTOMATIC IDENTIFICATION AND CLUSTERING OF PATTERNS

(71) Applicant: INTERNATIONAL BUSINESS MACHINES CORPORATION, Armonk, NY (US)

(72) Inventors: Stephen Arthur Boxwell, Columbus, OH (US); Keith Gregory Frost, Delaware, OH (US); Stanley John Vernier, Grove City, OH (US); Kyle Matthew Brake, Dublin, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 304 days.

(21) Appl. No.: 16/195,501

(22) Filed: Nov. 19, 2018

(65) Prior Publication Data

US 2020/0159757 A1 May 21, 2020

(51) Int. Cl.
*G06F 16/35* (2019.01)
*G06F 16/332* (2019.01)
(Continued)

(52) U.S. Cl.
CPC ........ *G06F 16/353* (2019.01); *G06F 16/3329* (2019.01); *G06F 16/3344* (2019.01);
(Continued)

(58) Field of Classification Search
CPC .... G06F 16/3329; G06F 16/353; G06F 16/35; G06F 16/332; G06F 16/00; G06F 17/2705; G06F 17/2785; G06F 17/27; G06F 17/00; G06F 17/30; G06F 16/185; G06F 16/22; G06F 16/168; G06F 16/16; G06F 16/11; G06F 16/156; G06F 16/128; G06F 16/134; G06F 16/122; G06F 16/182;
(Continued)

(56) References Cited

U.S. PATENT DOCUMENTS 5,841,895 A    11/1998  Huffman
9,830,381 B2 * 11/2017  Fan ....................... G06F 16/334
(Continued)

FOREIGN PATENT DOCUMENTS

CN    101685455 B    2/2012
RU      2646386 C1   12/2016

OTHER PUBLICATIONS

Hartrumpf et al., "Efficient Question Answering with Question Decomposition and Multiple Answer Streams," DCU Online Research Access Service. doi: 10.1007/978-3-642-15754-7_48. Year: 2009. 8 pages.

(Continued)

*Primary Examiner* — Phong H Nguyen
(74) *Attorney, Agent, or Firm* — Cantor Colburn LLP; David Mattheis (57) ABSTRACT

A computer-implemented method includes receiving a plurality of question, answer, passage (QAP) triples. Each of the plurality of QAP triples includes a question, an answer to the question and a passage containing the answer to the question. The received plurality of QAP triples is parsed to generate two or more patterns. The generated patterns are merged together to identify clusters of semantically related patterns.

14 Claims, 3 Drawing Sheets

(51) Int. Cl.
*G06F 40/30* (2020.01)
*G06F 40/205* (2020.01)
*G06F 16/901* (2019.01)
*G06F 16/33* (2019.01)

(52) U.S. Cl.
CPC ........ *G06F 16/9024* (2019.01); *G06F 40/205* (2020.01); *G06F 40/30* (2020.01)

(58) Field of Classification Search
CPC .............. G06F 16/1767; G06F 16/113; G06F 17/30893; G06F 40/30; G06F 16/3344; G06F 16/9024; G06F 40/205; G09B 3/00; G06Q 10/107
USPC .................................. 707/736, 737, 739, 798
See application file for complete search history.

(56) References Cited

U.S. PATENT DOCUMENTS

| | | | |
|---|---|---|---|
| 2007/0073533 A1* | 3/2007 | Thione | G06F 40/35 704/9 |
| 2010/0299139 A1* | 11/2010 | Ferrucci | G06F 16/3329 704/9 |
| 2011/0125734 A1 | 5/2011 | Duboue | |
| 2011/0320187 A1* | 12/2011 | Motik | G06F 40/295 704/9 |
| 2012/0077178 A1* | 3/2012 | Bagchi | G09B 7/00 434/362 |
| 2012/0078889 A1* | 3/2012 | Chu-Carroll | G06F 16/248 707/723 |
| 2012/0089622 A1* | 4/2012 | Fan | G06F 16/334 707/749 |
| 2013/0035930 A1* | 2/2013 | Ferrucci | G06F 16/90332 704/9 |
| 2014/0149446 A1* | 5/2014 | Kuchmann-Beauger | G06F 16/248 707/763 |
| 2014/0164303 A1 | 6/2014 | Bagchi | |
| 2014/0358890 A1 | 12/2014 | Chen | |
| 2015/0317383 A1* | 11/2015 | Alkov | H04L 51/04 707/738 |
| 2016/0012097 A1* | 1/2016 | Lee | G06F 16/2455 707/690 |
| 2018/0157642 A1 | 6/2018 | Matskevich | |
| 2019/0065576 A1* | 2/2019 | Peng | G06F 16/22 |

OTHER PUBLICATIONS

Yuan et al., "Watson and Healthcare: How natuaral language processing and semantic search could revolutionize clinical decision support," IBM developerWorks, URL: https://www.ibm.com/developerworks/library/os-ind-watson/index.html. Published Apr. 12, 2011. Retrieved Nov. 16, 2018.

Rob High, "The Era of Cognitive Systems: An Inside Look at IBM Watson and How it Works", IBM Redbooks, Dec. 12, 2012. 14 pages.

* cited by examiner

AUTOMATIC IDENTIFICATION AND CLUSTERING OF PATTERNS

BACKGROUND

The present invention relates to machine learning and, more specifically, to automatic identification and clustering of syntactic/semantic patterns.

An increasing number of cognitive systems are being developed and used in enterprises and other environments. Generally, a cognitive system may include a question answering component which may be an artificial intelligence application executing on data processing hardware that answers questions pertaining to a given subject-matter domain presented in natural language. For such question answering component it is often advantageous to identify shallow or deep syntactic/semantic relations in questions and passages. For example, an English speaker intuitively knows that the question "Who blorked a wug?" and the passage "A wug was blorked by John Smith" are closely related. A person reading such passage may realize, in fact, that the passage answers the question even if the person does not fully understand meanings of the words "wug" and "blork". This is achieved by identifying different syntactic patterns that correspond to the same semantics. What is needed is a method of automatic identification and clustering of such syntactic patterns that correspond to the same semantics.

SUMMARY

Embodiments of the present invention are directed to a computer-implemented method for automatically identifying related patterns. A non-limiting example of the computer-implemented method includes receiving a plurality of question, answer, passage (QAP) triples. Each of the plurality of QAP triples includes a question, an answer to the question and a passage containing the answer to the question. The received plurality of QAP triples is parsed to generate two or more patterns. The generated patterns are merged together to identify clusters of semantically related patterns.

Embodiments of the present invention are directed to a system for automatically identifying related patterns. A non-limiting example of the system includes a memory having computer-readable instructions and one or more processors for executing the computer-readable instructions. The computer-readable instructions include receiving a plurality of question, answer, passage (QAP) triples. Each of the plurality of QAP triples includes a question, an answer to the question and a passage containing the answer to the question. The received plurality of QAP triples is parsed to generate two or more patterns. The generated patterns are merged together to identify clusters of semantically related patterns.

Embodiments of the invention are directed to a computer-program product for automatically identifying related patterns, the computer-program product including a computer-readable storage medium having program instructions embodied therewith. The program instructions are executable by a processor to cause the processor to perform a method. A non-limiting example of the method includes receiving a plurality of question, answer, passage (QAP) triples. Each of the plurality of QAP triples includes a question, an answer to the question and a passage containing the answer to the question. The received plurality of QAP triples is parsed to generate two or more patterns. The generated patterns are merged together to identify clusters of semantically related patterns.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising,"

"includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the methods, and systems described below may advantageously be employed by various artificial intelligence systems that are tasked to answer questions. In such systems, it is generally advantageous to identify various types of syntactic/semantic relations in questions and passages. This incurs significant efforts in identifying different syntactic patterns which typically correspond to the same semantics. However, identifying domain-specific syntactic/semantic patterns that are likely to be relevant in the question answering domain is not a trivial task due to a large amount of noise that may be encountered in pattern comparison process.

Turning now to an overview of the aspects of the invention, one or more embodiments of the invention address the above-described shortcomings of the prior art by providing a mechanism to utilize a set of available QAP (question, answer, passage) triples for identifying syntactic/semantic relations in questions and passages. Given a set of QAPs, a QA supplement system according to some embodiments of this invention identifies unique properties of the focus in a question (e.g., the relation of the phrase "what president" to the rest of the sentence in the question "What president signed the Affordable Care Act?") to search for syntactic patterns that occur both in the provided question and the provided passage. Based on identified mapping between patterns, the QA supplement system merges identified pairings of patterns together and filters out semantically meaningless patterns. Advantageously, embodiments of the present invention provide two distinct merging functions, namely, an exact merge function and a partial merge function. Thus, embodiments of the QA supplement system employ a multi-step pattern merging and filtering process.

The above-described aspects of the invention address the shortcomings of the prior art by providing an efficient and substantially accurate method of identifying different syntactic patterns that correspond to the same semantics. In the past, there has not been an efficient or reliable way to identify such patterns. With embodiments of the invention, however, a cognitive system can be more efficiently trained using automatic identification and clustering of relevant patterns.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems can perform the following functions:
  Navigate the complexities of human language and understanding Ingest and process vast amounts of structured and unstructured data Generate and evaluate hypotheses
  Weigh and evaluate responses that are based only on relevant evidence
  Provide situation-specific advice, insights, and guidance
  Improve knowledge and learn with each iteration and interaction through machine learning processes
  Enable decision making at the point of impact (contextual guidance)
  Scale in proportion to the task
  Extend and magnify human expertise and cognition
  Identify resonating, human-like attributes and traits from natural language
  Deduce various language specific or agnostic attributes from natural language
  High degree of relevant recollection from data points (images, text, voice) (memorization and recall)
  Predict and sense with situation awareness that mimic human cognition based on experiences
  Answer questions based on natural language and specific evidence In one aspect, cognitive systems provide mechanisms for answering questions posed to these cognitive systems using a QA pipeline or QA system. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area (e.g., financial domain, medical domain, legal domain, etc.) where the body of knowledge (knowledgebase) can be organized in a variety of configurations, e.g., a structured repository of domain-specific information, such as ontologies, or unstructured data related to the domain, or a collection of natural language documents about the domain.

Content users can input questions in a natural language to the cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using natural language processing.

The QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e., candidate answer, is inferred by the question. This process is repeated for each of the candidate answers until the QA pipeline identifies candidate answers that surface as being significantly stronger than others and thus generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify question and answer attributes of the content.

Operating on such content, the QA pipeline generates answers for input questions using a plurality of intensive analysis mechanisms which evaluate the content to identify the most probable answers, i.e., candidate answers, for the input question. The most probable answers are output as a ranked listing of candidate answers ranked according to their relative scores or confidence measures calculated during the evaluation of the candidate answers, as a single final answer having a highest-ranking score or confidence measure, or which is a best match to the input question, or a combination of ranked listing and final answer.

Figure 1:
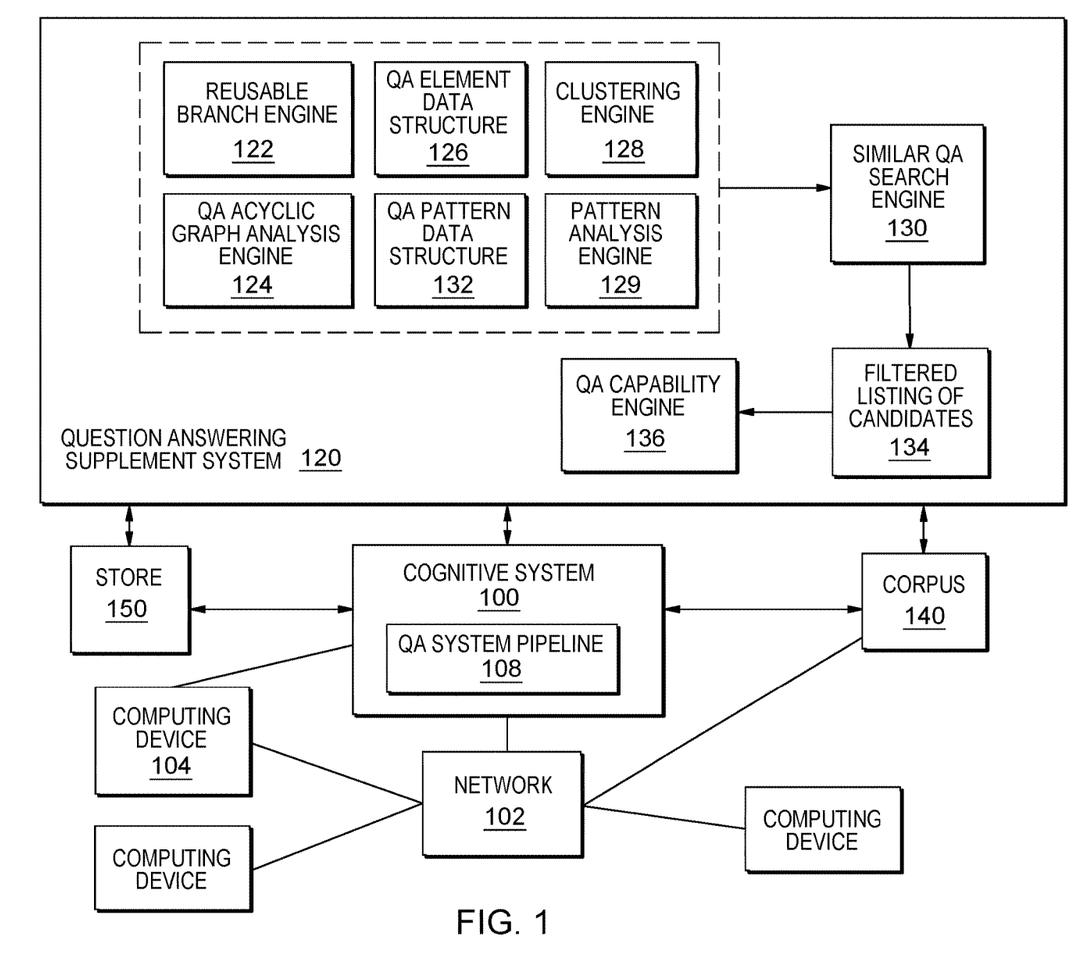
FIG. 1 depicts a schematic diagram of one illustrative embodiment of a cognitive system implementing a question answering (QA) supplement system in a computer network.

FIG. 1 depicts a schematic diagram of one illustrative embodiment of a cognitive system 100 implementing a question and answer (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables QA generation functionality for one or more cognitive system users via their respective computing devices. Other embodiments of the cognitive system 100 may be used with components, systems, sub-systems, and/or devices other than those that are depicted herein.

The cognitive system 100 is configured to implement a QA pipeline 108 that receive inputs from various sources. For example, the cognitive system 100 receives input from the network 102, corpus of electronic documents 140, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 140. Portions of the corpus of data 140 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 140 for use as part of a corpus of data with the cognitive system 100. The document includes any file, text, article, or source of data for use in the cognitive system 100. QA supplement system users access the cognitive system 100 via a network connection or an Internet connection to the network 102, and input questions to the cognitive system 100 that are answered by the content in the corpus of data 140. In one embodiment, the questions are formed using natural language. The cognitive system 100 parses and interprets the question via a QA pipeline 108 and provides a response to the cognitive system user containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 140. The QA pipeline 108 generates answers for the input question based on the processing of the input question and the corpus of data 140.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question, which it then parses to extract the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e., candidate answer, is inferred by the question. This process is repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation web site, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware, for integrating a QA supplement system 120.

One or more questions received from a user can be subjected to natural language processing techniques of the cognitive system 100 and/or QA supplement system 120 to transform the questions into acyclic graphs where nodes represent syntactic entities, and connectors represent the overall connections between the syntactic entities. This operation may be performed, for example, as part of an ingestion operation of the cognitive system 100 which reads the natural language text of the electronic documents or asked questions, parses the natural language text and performs natural language processing on the natural language text, including performing annotation operations using annotators, to extract key features and facts of the natural language text which are then converted to the acyclic graphs. The reading, parsing, and extracting can occur independent of the language of the electronic documents or asked questions.

The acyclic graphs of the analyzed QA pairs are stored in storage device 150 associated with either the cognitive system 100 or QA supplement system 120, where the storage device 150 may be a memory, a hard disk based storage device, flash memory, solid state storage device, or the like (hereafter assumed to be a "memory" with in-memory representations of the acyclic graphs for purposes of description).

Either as part of an ingestion operation, or by the QA acyclic graph analysis engine 124 analyzing the acyclic graphs generated by the ingestion operation, a QA element data structure 126 defining the various knowledge domains in the ingested corpus 140, as well as other QA elements pre-populated in the QA element data structure 126 either through analysis of other corpora or through manual input by subject matter expert interaction, is generated. According to an embodiment of the present invention, the QA acyclic graph analysis engine 124 may generate a plurality of triples consisting of a question, answer to the question and a passage utilized by the QA acyclic graph analysis engine 124 to infer the answer.

According to an embodiment of the present invention, during a training of the QA supplement system 120, the QA element data structure 126 (including QAP triples) is analyzed by a pattern analysis engine 129 to identify syntactic/semantic patterns that appear both in questions and passages and is further analyzed to determine whether the identified patterns are related to each other, as described in greater detail below. All identified patterns as well as relationships between patterns are stored in QA pattern data structure 132.

The QA pattern data structure 132 is analyzed by clustering engine 128 to identify clusters of syntactic/semantic patterns based on their characteristics. For example, QA patterns may be clustered by merging and filtering process according to the similarity of patterns to form QA pattern clusters. Advantageously, as noted above, various levels of merging may be performed.

In response to receiving the input utterance, a similar QA element search engine 130 performs a search of the QA pattern data structure 132 to generate a listing of the QA element clusters that involve the given new QA element(s)/patterns. The similar QA element search engine 130 then determines whether the presented question already contains any of the clusters of candidate QA patterns, i.e., the clusters identified as having the new QA pattern(s) in the request. For those that are already present within the utterance, the candidate clusters may be promoted in the listing to generate a filtered listing of candidate QA patterns and their clusters 134.

The QA patterns clusters in the filtered listing of candidate QA elements 134 are then analyzed by a QA element compatibility engine 136 to identify which of the element clusters are compatible with the knowledge domain of the question that is to be answered. The QA element compatibility engine 136 may utilize configured association rules learned during a training of the QA supplement system 120 and knowledge base, where the association rules specify compatibility of QA elements with different knowledge domains. Using these association rules, the QA element compatibility engine 136 determines what combinations or patterns of one or more QA elements are found in questions asked by subject matter experts working in the same knowledge domain. The intersection of the association rules with the candidate QA element clusters indicates which element clusters are compatible with the knowledge domain. The resulting candidate clusters that intersect with the association rules may then be ranked by the QA element compatibility engine 136, such as based on frequency of appearance of the clusters or QA patterns in the clusters. Other ranking criteria may also be utilized.

A QA pattern cluster in the filtered listing of candidate clusters 134, which also intersects with one or more of the association rules, is selected by the QA element compatibility engine 136 for use in providing an answer to a question. This selection may be based on the ranking of the clusters intersecting the association rules as discussed above. For example, a top ranked pattern cluster may be selected for use in presenting an answer to the utterance. Alternatively, other selection criteria may be utilized as well, such as in an implementation where the ranking of the clusters may not be performed.

Figure 2:
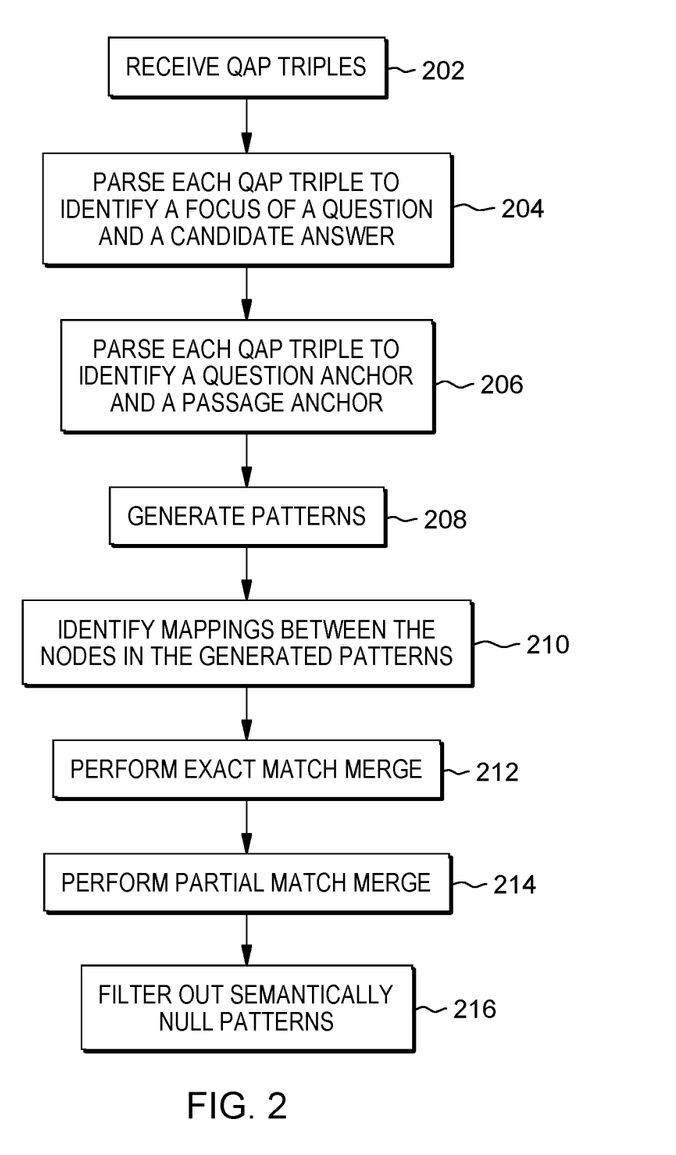
FIG. 2 is a flow diagram of a method for automatically identifying related patterns, according to some embodiments of the invention.

FIG. 2 is a flow diagram of a method for automatically identifying related patterns, according to some embodiments of the invention. At block 202, pattern analysis engine 129 receives a plurality of QAP triples. In an embodiment of the present invention, each of the plurality of triples may include three fields: a question, an answer to the question and a source passage from which the answer to the question was derived from. Functionality of the pattern analysis engine 129 can be beneficially described through examples presented below. For instance, a QAP triple may include the following fields "What president signed Medicare Bill?|Lyndon Johnson| The Medicare Bill was signed by Lyndon Johnson at the Harry S. Truman library".

At block 204, pattern analysis engine 129 parses each received QAP triple to identify, for each triple, a focus of the question and a candidate answer. Continuing with the exemplary QAP triple, the focus of the question is identified as "What president?" and the candidate answer is identified by the second field—"Lyndon Johnson".

At block 206, pattern analysis engine 129 iterates over each word(token) in the question and the passage fields of each QAP triple to identify a question anchor and a passage anchor based on the identified focus of the question and the candidate answer (step 204). As used herein, a question anchor and a passage anchor are two matching strings different from the focus of the question and the candidate answer. In various embodiments, pattern analysis engine 129 accounts for exact matches, synonymous strings and more general forms of string equivalencies when searching for question anchors and passage anchors. Still continuing with the exemplary QAP triple above, the word "sign" represents both the question anchor and the passage anchor within the respective fields.

At block 208, pattern analysis engine 129 generates patterns based on the analyzed question and passage fields for each QAP triple. In one embodiment, pattern analysis engine 129 may generate a syntax tree which includes a plurality of syntactic nodes for each question and each passage. In this embodiment, pattern analysis engine 129 may use a tree walk algorithm to enumerate the sub-graphs consisting of all the syntactic nodes positioned between the node representing the focus of the question ("What president?") and the node representing the question anchor ("sign") and to enumerate the sub-graphs consisting of all the syntactic nodes positioned between the node representing the candidate answer "Lyndon Johnson" and the node representing the passage anchor ("sign"). As part of the pattern generating step, pattern analysis engine 129 determines syntactic relations between the focus of the question and the question anchor and between the candidate answer and the passage anchor. For illustrative purposes only, the generated patterns may be represented using slot grammar. The output of slot grammar analysis of a sentence is a tree which shows both surface structure and deep grammatical relations, including remote dependencies, in a single structure. Slots can be viewed as names for syntactic roles of phrases in a sentence. Examples of slots include, but are not limited to, subj (subject), obj (direct object), iobj (indirect object), objprep (object of preposition), nobj (noun complement slot). By applying slot grammar to the QAP triple example above, the patterns generated by pattern analysis engine 129 are as follows:

```
pattern relation 1{
node node 1{
link "subj(n)" node 2;
}
node node 2{
}
} and
pattern relation 2{
node node 1{
link "nobj(n)" node 2;
}
node node 2{
feat "text" "by";
link "objprep" node 3;
}
node node 3 {
}
}
```

In other words, the first pattern (pattern relation 1) represents a "subj(n)" relation between the focus of the question and the question anchor and the second pattern (pattern relation 2) represents a "nobj(n)" to "objprep" relation between the passage anchor and the candidate answer (with a "by" in between) in the corresponding passage.

Referring back to FIG. 2, at block 210, pattern analysis engine 129 identifies mappings between the nodes in the generated patterns. In an embodiment, this step may be implemented by identifying several slots equaling the number of question anchor/passage anchor pairs plus the number of the focus of the question/candidate answer pairs. The slot names are consistent across both patterns. Continuing with the above exemplary QAP triple, pattern analysis engine 129 identifies the slot mappings (mappings between the nodes) as follows:

relation 1:
--slot 1:node 1
--slot 2: node 2
relation 2:
--slot 1:node 1
--slot 2:node 3

It should be noted that blocks 204-210 are performed by patent analysis engine 129 for every QAP triple received at block 202. However, it is possible for patent analysis engine 129 to detect QAP triples having the same question being repeated multiple times with different correct answers and passages. For example, the question "What country borders the United States?" has two correct answers—Canada and Mexico. It is also possible that the same question and answer will be repeated with the different passage, especially if the passages in QAP triples had been automatically generated by search components of the cognitive system 100.

It should be further noted that in addition to the patterns illustrated above, pattern analysis engine 129 is very likely to encounter a large amount of noise during pattern generation process. This could happen because the cognitive system's component generating QAP triples is likely to retrieve passages that contain the correct answer but do not necessarily answer the question as asked. The following QAP triple illustrates this case: "What president signed the Affordable Care Act? |Barack Obama| Because Barack Obama was the 44$^{th}$ president of the United States, collectors are particularly eager to obtain his signed basketball jerseys." In this example of QAP triple, the syntactic relation between the focus of the question ("what president") and the question anchor ("signed") is the same as in previous examples and is semantically reasonable. However, in the passage of this QAP triple the syntactic relation between the candidate answer ("Barack Obama") and the passage anchor ("signed") is circuitous and semantically irrelevant. These kinds of patterns are referred to hereinafter as "semantically null patterns". Advantageously, embodiments of the present invention disclose a method of automatically filtering out these semantically null patterns.

According to an embodiment of the present invention, to filter out the semantically null patterns, clustering engine 128 merges the patterns generated at block 208 together and filters out the semantically null patterns. Referring back to FIG. 2 again, at block 212, clustering engine 128 performs an exact match merge operation first. This operation can be illustrated with the following two QAP triples: "What president signed Medicare Bill? |Lyndon Johnson| The Medicare Bill was signed by Lyndon Johnson at the Harry S. Truman library" and "What general led the American Revolution? |George Washington| George Washington led the Continental Army during the American Revolution." Evaluation of both QAP triples results in the same pattern pairs being generated by pattern analysis engine 129 at block 208. In this case, pattern analysis engine 129 determines that both QAP triples involve passive voice alternations and generates equivalent patterns at block 208. The generation of equivalent patterns, in this case, suggests that this pattern pair is not noise. Furthermore, because of a close match between patterns of this QAP triples pair the generated patterns are good candidates for performing an exact match merge operation at block 212.

Next, for all the patterns that were not good candidates for performing an exact match merge operation, at block 214, clustering engine 128 attempts to perform a partial match merge operation. This operation can be illustrated with another pair of QAP triples: "What president signed Medicare Bill? |Lyndon Johnson| The Medicare Bill was signed by Lyndon Johnson at the Harry S. Truman library" and "What general led the American Revolution? |George Washington| The American Revolution, which was led by George Washington, resulted in independence from Great Britain." Evaluation of both QAP triples results in the same pattern pairs being generated by pattern analysis engine 129 at block 208. In this case, pattern analysis engine 129 generates two different pattern sets at block 208. These two different pattern sets would not be good candidates for performing an exact match merge operation. However, these pattern sets are good candidates for performing a partial match merge operation because each pattern set contains a pattern matching a pattern in the other pattern set.

At block 216, clustering engine 128 filters out patterns based on the merge performed at blocks 212 and 214. Advantageously, embodiments of the present invention disclose a multi-step pattern merging and filtering process.

The system steps described above can also be described in algorithmic format:

0. Given a list P of pattern groups (initially each pattern group contains 2 patterns)
1. Let R be an empty set of pattern groups
2. Let B be a list of flags of the same length of P, initially all set to false
3. For 0 < I < length(P):
4. if B[i] is false:
5. Copy P(i) into a new Pattern Group S
6. For i < j < length(P):
7. if B[j] is false:
8. if P(i) is a candidate for an EXACT MATCH merge with P(j), then merge P(j) into S and set B[j] to true
9. add S to R
10. Remove from R any pattern groups that consist of fewer than N original pattern groups (where N is a tuning factor).
12. Let B' be a list of flags of the same length of R', initially all set to false
13. For 0 < i < length(R):
14. if B'[i] is false:
15. Copy R(i) into a new Pattern Group S
16. For i < j < length(P):
17. if B'[j] is false:
18. if R(i) is a candidate for an PARTIAL MATCH merge with R(j), then merge R(j) into S and set B'[j] to true
19. add S to R'
20. Remove from R' any pattern groups that consist of fewer than M original pattern groups (where M is a tuning factor).

Figure 3:
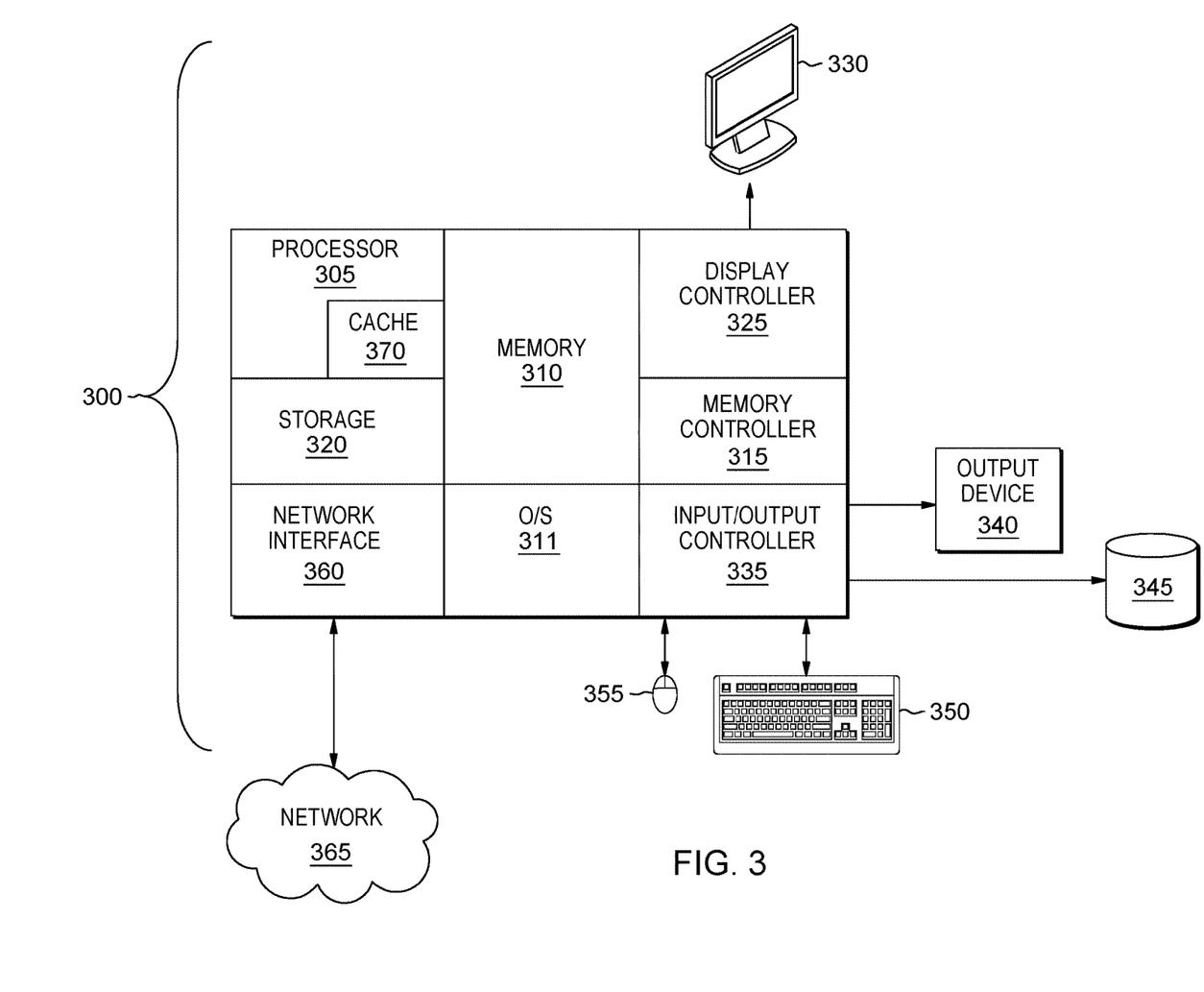
FIG. 3 is a block diagram of a computer system for implementing some or all aspects of the sourcing system, according to some embodiments of this invention.

FIG. 3 is a block diagram of a computer system 300 for implementing some or all aspects of the cognitive system 100, according to some embodiments of this invention. The cognitive systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For instance, the question answering supplement system 120, the pattern analysis engine 129, and the clustering engine 128 may each be implemented as a computer system 300 or may run on a computer system 300.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the cognitive systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Cognitive systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for automatically identifying related patterns, the computer-implemented method comprising:
   receiving a plurality of question, answer, passage (QAP) triples, each of the plurality of QAP triples comprising a question, an answer to the question and a passage containing the answer to the question;
   parsing the received plurality of QAP triples to generate two or more patterns, each of the two or more patterns representing relationships between two or more syntactic nodes associated with the question and the answer, wherein the parsing the received plurality of QAP triples comprises identifying a focus of the question within the question of a QAP and identifying a candidate answer within the corresponding passage of the QAP, and further comprises identifying a question anchor within the question of the QAP and identifying a passage anchor within the corresponding passage of the QAP; and
   merging the generated two or more patterns to identify clusters of semantically related patterns.

2. The computer-implemented method of claim 1, further comprising:
   filtering out semantically null patterns based on the merging.

3. The computer-implemented method of claim 1, wherein the merging the generated two or more patterns further comprises performing an exact match merging.

4. The computer-implemented method of claim 3, wherein the merging the generated two or more patterns further comprises performing a partial match merging.

5. The computer-implemented method of claim 1, wherein first of the generated two or more patterns represents syntactic relationships between the focus of the question and the question anchor within the question of the QAP and wherein second of the generated two or more patterns represents syntactic relationship between the candidate answer and the passage anchor within the corresponding passage of the QAP.

6. A system comprising:
a memory having computer-readable instructions; and
one or more processors for executing the computer-readable instructions, the computer-readable instructions comprising:
receiving a plurality of question, answer, passage (QAP) triples, each of the plurality of QAP triples comprising a question, an answer to the question and a passage containing the answer to the question;
parsing the received plurality of QAP triples to generate two or more patterns, each of the two or more patterns representing relationships between two or more syntactic nodes associated with the question and the answer, wherein the parsing the received plurality of QAP triples comprises identifying a focus of the question within the question of a QAP and identifying a candidate answer within the corresponding passage of the QAP, and further comprises identifying a question anchor within the question of the QAP and identifying a passage anchor within the corresponding passage of the QAP; and
merging the generated two or more patterns to identify clusters of semantically related patterns.

7. The system of claim 6, the computer-readable instructions further comprising filtering out semantically null patterns based on the merging.

8. The system of claim 6, wherein the merging the generated two or more patterns further comprises performing an exact match merging.

9. The system of claim 8, wherein the merging the generated two or more patterns further comprises performing a partial match merging.

10. The system of claim 6, wherein first of the generated two or more patterns represents syntactic relationships between the focus of the question and the question anchor within the question of the QAP and wherein second of the generated two or more patterns represents syntactic relationship between the candidate answer and the passage anchor within the corresponding passage of the QAP.

11. A computer-program product for automatically identifying related patterns, the computer-program product comprising a non-transitory computer-readable storage medium having program instructions embodied therewith, the program instructions executable by a processor to cause the processor to perform a method comprising:
receiving a plurality of question, answer, passage (QAP) triples, each of the plurality of QAP triples comprising a question, an answer to the question and a passage containing the answer to the question;
parsing the received plurality of QAP triples to generate two or more patterns, each of the two or more patterns representing relationships between two or more syntactic nodes associated with the question and the answer, wherein the parsing the received plurality of QAP triples comprises identifying a focus of the question within the question of a QAP and identifying a candidate answer within the corresponding passage of the QAP, and further comprises identifying a question anchor within the question of the QAP and identifying a passage anchor within the corresponding passage of the QAP; and
merging the generated two or more patterns to identify clusters of semantically related patterns.

12. The computer-program product of claim 11, the method further comprising filtering out semantically null patterns based on the merging.

13. The computer-program product of claim 11, wherein the merging the generated two or more patterns further comprises performing an exact match merging.

14. The computer-program product of claim 13, wherein the merging the generated two or more patterns further comprises performing a partial match merging.

* * * * *